US011019672B2

(12) United States Patent
Hagiu

(10) Patent No.: US 11,019,672 B2
(45) Date of Patent: May 25, 2021

(54) METHOD, CHIP AND SYSTEM FOR DETECTING A FAILURE IN A PDP CONTEXT OR AN EPS PDN CONNECTION

(71) Applicant: GEMALTO SA, Meudon (FR)

(72) Inventor: Andrei Marian Hagiu, Gemenos (FR)

(73) Assignee: THALES DIS FRANCE SA, Meudon (FR)

( * ) Notice: Subject to any disclaimer, the term of this patent is extended or adjusted under 35 U.S.C. 154(b) by 38 days.

(21) Appl. No.: 16/305,306

(22) PCT Filed: May 31, 2016

(86) PCT No.: PCT/EP2016/062282
§ 371 (c)(1),
(2) Date: Nov. 28, 2018

(87) PCT Pub. No.: WO2017/207033
PCT Pub. Date: Dec. 7, 2017

(65) Prior Publication Data
US 2020/0187287 A1    Jun. 11, 2020

(30) Foreign Application Priority Data
May 30, 2016  (ES) ............................... ES201600434

(51) Int. Cl.
*H04W 76/18* (2018.01)
*H04W 76/12* (2018.01)
(Continued)

(52) U.S. Cl.
CPC ........... *H04W 76/18* (2018.02); *H04W 8/205* (2013.01); *H04W 8/245* (2013.01); *H04W 76/12* (2018.02); *H04W 92/08* (2013.01)

(58) Field of Classification Search
CPC ..... H04W 76/18; H04W 8/245; H04W 8/205; H04W 76/12; H04W 92/08
See application file for complete search history.

(56) References Cited

U.S. PATENT DOCUMENTS

| | | | | |
|---|---|---|---|---|
| 2010/0232386 A1* | 9/2010 | Dong | ..................... | H04W 76/20 370/329 |
| 2012/0275312 A1* | 11/2012 | Cormier | ................ | H04W 8/183 370/241 |
| 2013/0012163 A1* | 1/2013 | Reddy | ............... | H04W 12/0017 455/410 |

FOREIGN PATENT DOCUMENTS

| | | | |
|---|---|---|---|
| EP | 2519040 A1 | 10/2012 | |
| EP | 2887712 A1 * | 6/2015 | .............. H04W 8/18 |

(Continued)

OTHER PUBLICATIONS

ETSI TS 131.102 v.12.5.0 UMTS, LTE, characteristic of USIM (Year: 2014).*

(Continued)

*Primary Examiner* — Rina C Pancholi
(74) *Attorney, Agent, or Firm* — Buchanan Ingersoll & Rooney PC

(57) ABSTRACT

The invention relates to a method for detecting a failure in a PDP context or an EPS PDN connection. A chip incorporated within or coupled to a device receives from the device a call control PDP context activation type event or a call control EPS PDN connection activation type event. The chip receives from the device an updated value relating to an HFN start PS. The chip compares the last updated value relating to the HFN start PS to a predetermined value relating to the HFN start PS. If the last updated value relating to the HFN start PS is greater than or is less than/equal to the predetermined value relating to the HFN start PS, then the chip detects that the PDP context or the EPS PDN connection has been successfully or unsuccessfully activated respectively.

9 Claims, 1 Drawing Sheet

(51) Int. Cl.
*H04W 8/20* (2009.01)
*H04W 8/24* (2009.01)
*H04W 92/08* (2009.01)

(56) References Cited

FOREIGN PATENT DOCUMENTS

| EP | 2889799 A1 * | 7/2015 | ......... H04L 63/0876 |
| WO | 2009025375 A1 | 2/2009 | |

OTHER PUBLICATIONS

International Search Report (PCT/ISA/210) dated Feb. 3, 2017, by the European Patent Office as the International Searching Authority for International Application No. PCT/EP2016/062282.
Written Opinion (PCT/ISA/237) dated Feb. 3, 2017, by the European Patent Office as the International Searching Authority for International Application No. PCT/EP2016/062282.
3rd Generation Partnership Project; Technical Specification Group Services and System Aspects; 3G Security; Security arachitecture (Release 13), 3GPP TS 33.102 v13.0.0 (Jan. 2016), 76 pages.
3rd Generation Partnership Project; Technical Specification Group Core Network and Terminals; Characteristics of the Universal Subscriber Identity Module (USIM) application (Release 13), 3GPP TS 31.102 v13.3.0 (Mar. 2016), 216 pages.

* cited by examiner

METHOD, CHIP AND SYSTEM FOR DETECTING A FAILURE IN A PDP CONTEXT OR AN EPS PDN CONNECTION

FIELD OF THE INVENTION

The invention relates generally to a method for detecting a failure in a Packet Data Protocol (or PDP) context or an Evolved Packet System (or EPS) Packet Data Network (or PDN) connection.

Furthermore, the invention also pertains to a chip for detecting a failure in a PDP context or an EPS PDN connection.

Finally, the invention relates to a system for detecting a failure in a PDP context or an EPS PDN connection as well.

The present invention is notably applicable to a mobile (radio-communication) field wherein a chip may be either embedded, such as an embedded Universal Integrated Circuit Card (or eUICC) within a device, or removable, such as a chip included within a smart card termed Subscriber Identity Module (or SIM) type card or the like, as a Secure Element (or SE), from a chip host device.

Within the present description, an SE is a smart object that includes a chip that protects, as a tamper resistant component, access to stored data and is intended to communicate data with an SE host device, like e.g. a mobile (tele)phone, a Machine to Machine (or M2M) or an Internet of Things (or IoT) device.

STATE OF THE ART

As known per se, a mobile phone is able to open a PDP context or an EPS PDN connection. Once the PDP context or the EPS PDN connection, as a tunnel to a Packet Data Service (or PDS) network, is opened, the phone accesses, through a connected mobile (radio-communication) network, the PDS network.

However, the phone or the mobile network may fail in activating a PDP context or an EPS PDN connection and therefore loose a data connectivity to the PDS network. For consumers, when the data connectivity is lost, i.e. not established (or failed), there is a huge negative impact on a user experience.

Thus, there is a need to provide a solution that allows detecting, in an efficient, quick and simple manner, a failure in a PDP context or an EPS PDN connection.

SUMMARY OF THE INVENTION

The invention proposes a solution for satisfying the just herein above specified need by providing a method for detecting a failure in a PDP context or an EPS PDN connection.

According to the invention, a chip is incorporated within or coupled to a device. The chip comprises an EF including data relating to an HFN start PS. The method comprises the following steps. The chip receives from the device a call control PDP context activation type event or a call control EPS PDN connection activation type event. The chip receives from the device at least one updated value relating to the HFN start PS. The chip stores the at least one updated value relating to the HFN start PS. The chip compares the last updated value relating to the HFN start PS to a predetermined value relating to the HFN start PS. If the last updated value relating to the HFN start PS is greater than or is less than/equal to the predetermined value relating to the HFN start PS, then the chip detects that the PDP context or the EPS PDN connection has been successfully or unsuccessfully activated respectively.

The principle of the invention consists in that a chip that stores an Elementary File (or EF) with data relating to an HyperFrame Number (or HFN) start Packet Switch (or PS) receives from a cooperating device a call control PDP context activation type event (or a call control EPS PDN connection activation type event). The chip receives from the device and stores one or several updated values relating to the HFN start PS. The chip compares the last updated value relating to the HFN start PS to a predetermined value relating to the HFN start PS. The chip determines, based on a comparison to the predetermined value relating to the HFN start PS, whether a PDP context (or an EPS PDN connection) has (or not) been successfully activated. If the last updated value relating to the HFN start PS is greater than the predetermined value relating to the HFN start PS, the chip determines that the PDP context (or the EPS PDN connection) has been successfully activated. If the last updated value relating to the HFN start PS is less than or equal to the predetermined value relating to the HFN start PS, the chip determines that the PDP context (or the EPS PDN connection) has not been activated.

A triggering of a detection of a possible failure in a PDP context (or an EPS PDN connection) at a chip side is a reception of a call control PDP context activation type event (or a call control EPS PDN connection activation type event).

The detection of a possible success or failure is based on a comparison of a last updated value relating to the HFN start PS that is stored in a specific EF to a predetermined value relating to the HFN start PS that is stored within the chip.

The invention method is automatically implemented.

Thus, a user of the chip that implements the invention method is not involved to detect a possible success or failure in a PDP context (or an EPS PDN connection).

The invention method is therefore convenient for the user. The user has neither to go to an office of a Mobile Network Operator (or MNO), a Mobile Network Virtual Operator (or MVNO) or a service provider, nor to call any technical support platform relating to a service provider.

The invention method allows determining, in a reliable manner, a success or a failure in a PDP context or an EPS PDN connection establishment.

Once the chip has detected a failure in a PDP context or an EPS PDN connection, the chip may also detect one or several reasons why the failure has occurred. The chip may then let re-configure or re-configure the device by using a right configuration parameter(s) for configuring an access to a PDS type network that is(are) loaded from a remote server or the chip.

Such a device re-configuration operation with the right configuration parameter(s) may be launched immediately and automatically after a detection of a failure in a PDP context (or an EPS PDN connection).

The proposed invention solution allows being able to quickly enhance a user experience who benefits, after a device (re-)configuration operation, from an access to the Packet Data Service(s).

According to a further aspect, the invention is a chip for detecting a failure in a PDP context or an EPS PDN connection.

According to the invention, the chip is likely to be incorporated within or coupled to a device. The chip comprises an EF including data relating to an HFN start PS. The chip is configured to receive from the device a call control PDP context activation type event or a call control EPS PDN connection activation type event. The chip is configured to receive from the device at least one updated value relating to the HFN start PS. The chip is configured to store the at least one updated value relating to the HFN start PS. The chip is configured to compare the last updated value relating to the HFN start PS to a predetermined value relating to the HFN start PS. The chip is configured to detect, if the last updated value relating to the HFN start PS is greater than or is less than/equal to the predetermined value relating to the HFN start PS, that the PDP context or the EPS PDN connection has been successfully or unsuccessfully activated respectively.

The chip may be fixed to or removable from a host device.

The chip is preferably included within an SE.

The invention does not impose any constraint as to a kind of the SE type.

As a removable SE, it may be a SIM type card, a Machine Identification Module (or MIM), a Secure Removable Module (or SRM), a smart dongle of the USB (acronym for "Universal Serial Bus") type, a (micro-) Secure Digital (or SD) type card or a Multi-Media type Card (or MMC) or any format card (or another medium) to be coupled or connected to a chip host device.

As to the chip host device, it may be constituted by any electronic device, like e.g. a user terminal, a terminal or a M2M or an IoT device, comprising data processing means, data storing means and one or several Input/Output (or I/O) communication interfaces.

According to still a further aspect, the invention is a system for detecting a failure in a PDP context or an EPS PDN connection.

According to the invention, the system comprises at least one device and a chip. The chip is incorporated within or coupled to the device. The chip comprises an EF including data relating to an HFN start PS. The chip is configured to receive from the device a call control PDP context activation type event or a call control EPS PDN connection activation type event. The chip is configured to receive from the device at least one updated value relating to the HFN start PS, store the at least one updated value relating to the HFN start PS and compare the last updated value relating to the HFN start PS to a predetermined value relating to the HFN start PS. The chip is configured to detect, if the last updated value relating to the HFN start PS is greater than or is less than/equal to the predetermined value relating to the HFN start PS, that the PDP context or the EPS PDN connection has been successfully or unsuccessfully activated respectively.

BRIEF DESCRIPTION OF THE DRAWINGS

Additional features and advantages of the invention will be more clearly understandable after reading a detailed description of one preferred embodiment of the invention, given as one indicative and non-limitative example, in conjunction with the following drawings.

DETAILED DESCRIPTION

Herein under is considered an embodiment in which the invention method for detecting a failure in a PDP context (and/or an EPS PDN connection) is implemented notably by a chip, like e.g. an eUICC, as a chip incorporated, possibly in a removable manner, on a Printed Circuit Board (or PCB) of a terminal, as a chip host device.

The chip may also incorporate at least part of the terminal component(s), like e.g. a baseband processor, an application processor and/or other electronic component(s).

Alternately, instead of an eUICC, the chip may be a Trusted Execution Environment (or TEE), as a secure area of a terminal processor and a secured runtime environment.

The chip is preferably included within an SE.

The SE may nevertheless have different form factors.

Instead of being embedded within its host device, the chip may be carried by a medium, such as a smart card or a dongle, like e.g., a USB type dongle, and is communicatively coupled or connected to the host device.

Naturally, the herein below described embodiment is only for exemplifying purposes and is not considered to reduce the scope of the invention.

Figure 1:
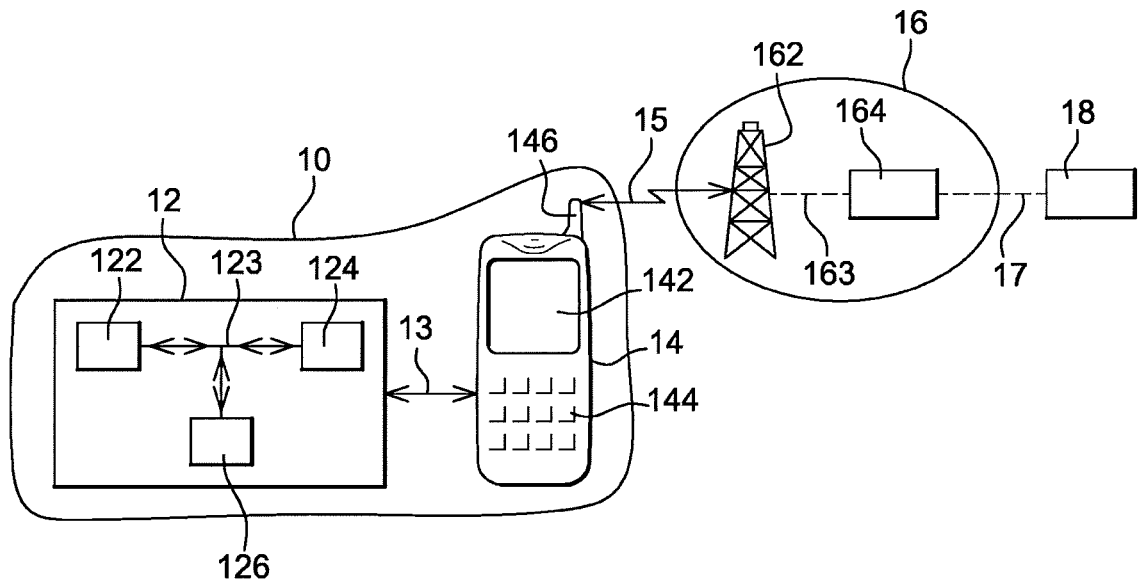
FIG. 1 is a simplified diagram of a terminal equipment, a (mobile) network and a PDS type network, the terminal equipment comprising a phone and a chip being arranged to detect a failure in a Third Generation (or 3G) type PDP context with possibly a reason(s) why the failure occurs, according to the invention.

FIG. 1 shows schematically a Terminal Equipment (or TE) 10, a visited mobile network 16 and a PDS network 18.

The TE 10 includes a chip 12 and a mobile phone 14, as a (user) terminal and a chip host device.

For sake of simplicity, the chip 12, the mobile phone 14, the visited mobile network 16 and the PDS network 18 are termed infra the SE 12, the host 14, the mobile network 16 and the PDS 18 respectively.

The TE 10 is under a radio coverage of the mobile network 16.

A TE 10 user benefits preferably from one or several subscriptions to access the mobile network 16.

The (user) terminal, the terminal or a machine in an M2M as a terminal may be fixed (i.e. not mobile) or mobile.

The (user) terminal may be a Personal Digital Assistant (or PDA), a vehicle, a Point Of Sale (or POS), an electricity meter, a water meter, a gas meter, any meter, a set-top box, a tablet computer, a desktop computer, a laptop computer, a video player, an audio player, a portable TeleVision (or TV), a media-player, a game console, a netbook, an electronic mobile equipment or an accessory (e.g.: glasses, a watch or a jewel) or an IoT device.

Instead of a phone, the user terminal or the terminal may be any other computer device including means for processing data, comprising (or being connected to) wireless communication means for exchanging data with outside, and comprising (or being connected to) means for storing data.

Within the present description, the adjective "wireless" used within the expression "wireless communication means" denotes notably that the communication means communicates via one or several Long Range (or LR) Radio-Frequency (or RF) links.

The LR RF may be fixed at several hundreds of MHz, for instance, around 850, 900, 1800, 1900 and/or 2100 MHz.

The host 14 is used for accessing one or several mobile (radio-communication) networks, namely at least the mobile network 16.

The host 14 is used for accessing, through the (mobile) network(s) 16, the PDS 18, like e.g. the Internet network, as a computer network.

To access the PDS 18, the host 14 stores one or several configuration parameters, among which one or several configuration parameters may be selected by the host 14 or the user.

The configuration parameter(s) may include one or several user names, one or several passwords, one or several user credentials, one or several Access Point Names (or APN), one or several URLs, one or several IP addresses, one or several address types, like e.g. IPv4 or IPv6, and/or one or several Quality of Service (or QoS).

The APN, as a configuration parameter, is the name of a gateway between a mobile network 16 and a computer network 18.

The APN is used by a terminal device, like e.g., the phone, to open a PDP context (and/or a PDN connection), through a gateway(s), as described infra in more details.

An APN structure comprises an identifier of a network, like e.g. a network identifier, which the gateway is connected to. Optionally, the APN structure may comprise the service, like e.g., a Wireless Application Protocol (or WAP) server or a Multimedia Messaging Service (or MMS).

The APN structure may comprise an identifier of an MNO, like e.g., mnc<MNC>.mcc<MCC>.gprs, in which mnc is a Mobile Network Code and mcc is Mobile Network Code which together identify uniquely the MNO.

The APN may be absent, further to e.g., a previous erasure, or present, while being not right within the host memory, and therefore corrupted. When corrupted, the configuration parameter stored within the host 14 memory does not allow accessing, through a connected mobile network(s) 16, the PDS 18.

The host memory may be constituted by one or several EEPROMs (acronym for "Electrically Erasable Programmable Read-Only Memory"), one or several ROMs (acronym for "Read Only Memory"), one or several Flash memories, and/or any other memories of different types, like one or several RAMs (acronym for "Random Access Memory").

The host 14 is coupled or connected, through a bi-directional link 13, to the SE 12, as a chip embedded within (or coupled to) the host 14.

The SE 12 is under control of a host 14 (micro) processor(s) (and/or (micro)controler(s)) (not represented), as data processing means.

The SE 12 is preferably associated with or tied to a Network Access Server (or NAS) (not represented). The NAS is included within (or connected to) the mobile network 16.

The SE 12 belongs to a user, as a subscriber to a wireless service(s).

The SE 12 includes a (micro)processor(s) (and/or (micro) controler(s)) 122, as data processing means, a memory(ies) 124, as data storing means, and one or several I/O interfaces 126 that are internally all connected, through an internal bidirectional data bus 123, to each other.

The I/O interface(s) 126 allow(s) communicating data from the internal SE 12 components to the chip exterior and conversely.

The memory 124 stores an Operating System (or OS).

The memory 124 stores preferably one or several SIM type applications.

The SIM type application(s) includes, among others, a SIM application for a Global Service for Mobiles (or GSM) type network, a Universal Subscriber Identity Module (or USIM) application for a Universal Mobile Telecommunications System (or UMTS) type network and/or a Code Division Multiple Access (or CDMA) Subscriber Identity Module (or CSIM) application.

The SIM type application(s) allow(s) the host 14 to identify and authenticate to one or several mobile networks, like e.g., the mobile network 16.

The memory 124 stores, preferably in a secure manner, preferably a plurality of sets of data relating, each, to a subscription, as a wireless service(s).

Each set of data relating to one subscription includes preferably:

an International Mobile Subscriber Identity (or IMSI), as a subscriber and a (service) subscription identifier for accessing a mobile network;

a key Ki, as a Network Authentication Key (or NAK), allowing to authenticate the concerned subscriber to the concerned mobile network;

Milenage (or the like), as a network authentication algorithm, allowing to authenticate the concerned subscriber to the concerned mobile network;

a file system including one or several Elementary Files (or EF);

one or several security keys, like e.g. a key(s) for encrypting/decrypting data and/or a key(s) for signing data a key(s), as secret data; and/or one or several credentials, like e.g. a user name and/or an IDentifier (or ID) of the subscriber, as data relating to the user.

As EF, the memory 124 comprises preferably an EF 6F5B, as an EF start-HFN (as initialisation values for HFN), which is used by the host 14 to read and update the EF start-HFN. The EF start-HFN is compliant preferably with standard technical specifications, like e.g. ETSI TS 131.102, such as v.12.5.0 (September 2014).

The EF start-HFN includes preferably the HFN start PS.

According to a particular embodiment, the HFN start PS includes the three less significant bytes, i.e. bytes 4 to 6 of 6 byte string. According to such a particular embodiment, the HFN start CS includes the three most significant bytes, i.e. bytes 1 to 3 of 6 byte string.

The EF start-HFN includes e.g. the nibbles that follow "F00000", as an initialisation value for the (HFN)-PS (domain) and data relating to an HFN start PS. As known per se, two nibbles correspond to 1 byte.

The memory 124 stores e.g. the nibbles that follow "000FFF", as a predetermined (reference) value relating to the HFN start PS. The predetermined value relating to the HFN start PS may be chosen between "0000FF" and "0FFFF0", as a range of predetermined values relating to the HFN start PS.

A comparison with respect to the predetermined value relating to the HFN start PS allows the SE 12 to detect whether a PDP context (or an EPS PDN connection) has been successfully or unsuccessfully activated (based on a comparison result to the predetermined value relating to the HFN start PS).

The memory 124 may store data relating to a Uniform Resource Identifier (or URI), a Uniform Resource Locator (or URL), an Internet Protocol (or IP) address and/or other data relating to an external entity to be addressed, like e.g. a remote server accessible within or through the mobile network 16 and the PDS 18.

The processor 122 processes, controls and communicates internally data with all the other components incorporated within the SE 12 and, through the I/O interface(s) 126, with the chip exterior.

The processor 122 executes or runs one or several applications, like e.g. an (invention) application for detecting a failure in a PDP context (and/or a PDN connection) that is termed applet (in the Java programming language) infra.

The applet is a small size applet, like e.g. between 1 kb and 3 or 4 kb.

The SE 12, and more exactly the applet, is configured to detect (from the SE 12) a failure in a PDP context (and/or a PDN connection), in order to have an image of the data availability. To detect such a failure in a PDP context (and/or a PDN connection), the SE 12 is triggered when the SE 12 receives a Call Control (or CC) PDP context activation type event (and/or a CC PDN connection activation type event).

As known per se, the SE 12 is previously preferably registered to the host 14, so as to receive such a CC PDP context activation type event (and/or a CC PDN connection activation type event) by providing the host 14 with an event set, like e.g. CC, as an event(s).

The CC PDP context activation type event (and/or a CC PDN connection activation type event) may comprise or be accompanied with one or several parameters for configuring an access to the PDS 18, as configuration parameters.

The SE 12, and more exactly the applet, stores preferably e.g. a data length equals to zero, as information relating to an absence of configuration parameter(s), received from the host 14, when no configuration parameter is received.

The SE 12, and more exactly the applet, stores preferably a (current) value of the configuration parameter(s) received from the host 14, when applicable.

For instance, when a previous access (i.e. a PDP context (and/or a PDN connection) to the PDS 18 has been successfully established, the SE 12 stores a previous value of the configuration parameter(s) received from the host 14.

The SE 12 is preferably adapted to detect whether the (last received and stored) value of the configuration parameter(s) that may be associated with an unsuccessful access to the PDS 18 is or is not different from the previous value of the configuration parameter(s) that may be associated with a (previous) successful access to the PDS 18. If the current value and the previous value are different from each other, then such a change of the value of the configuration parameter(s) may be a reason for a PDS access failure.

The processor 122 executes, in a preferred manner, one or several security functions, like e.g. a data encryption/decryption, a data signature and/or a user authentication process to be used prior to continuing to access the SE 12, notably at a boot, i.e. a power on, of the SE 12.

The processor 122 is preferably able to initiate an action(s), in order to interact directly with the outside world, in an independent manner of the host 14. Such a capacity of interaction at the initiative of the SE 12 is also known as being a proactive capacity in which the SE 12 plays a role of a master while the SE host device plays a role of a slave. According to one preferred embodiment, the SE 12 is able to use SIM ToolKit (or STK) type commands, as proactive commands.

Among the supported applications, the memory 124 stores an (invention) applet that the processor 122 executes.

The applet allows carrying out a detection of a failure of an access (i.e. a PDP context (and/or a PDN connection)) to the PDS 18 with possibly a current configuration parameter(s) registered within the host 14.

The applet is preferably configured to detect whether an initial Radio Access Technology (or RAT) used by the host 14 to access the mobile network 16 is (or is not) a 3G type technology. To do this, the applet receives from the host 14 a LOCation Information (or LOCI) type response data (by a possible registration to a Location Status Event or upon an SE 12 request, like e.g. "Provide LOCI") or Access Technology (or AT) information and the applet detects, based on the received data, namely LOCI or AT information, whether the host 14 does (or does not) access the mobile network 16 by using a 2G, 3G or 4G type technology. The applet is configured to detect whether a current RAT has or has not changed from the 3G type technology, as the initial RAT.

The applet uses preferably an external file update event for the EF start-HFN, so as to detect that the EF start-HFN has been updated.

Once the applet receives the external file update event for the EF start-HFN, the applet receives and stores each updated value relating to the HFN start PS.

Then, the applet compares the last updated value relating to the HFN start PS to e.g. the nibbles that follow "000FFF", as the predetermined (reference) value relating to the HFN start PS.

To determine the last updated value relating to the HFN start PS, the SE 12 may implement a timer mechanism or the like. The timer mechanism is configured with e.g. 2 or 3 s (or seconds) up to 1 min (or minute), as a predetermined timer value, at which the stored updated value relating to the HFN start PS is considered as being the last. The timer mechanism may be based on a receipt of a predetermined number of a predefined command, like e.g. a status command, that is regularly received from or through the host 14.

The applet detects, if the last updated value relating to the HFN start PS is greater than the predetermined value relating to the HFN start PS, that the PDP context (or the EPS PDN connection) has been successfully activated, i.e. has succeeded.

The applet detects, if the last updated value relating to the HFN start PS is less than or equal to the predetermined value relating to the HFN start PS, that the PDP context (or the EPS PDN connection) has been unsuccessfully activated, i.e. has failed.

The applet may allow providing one or several reasons for the PDS access failure.

A failure reason may be that the configuration parameter(s) that is(are) currently stored by or absent at the host 14 is(are) not the right one(s), i.e. is(are) corrupted, so as to access the PDS 18.

A failure reason may be that the configuration parameter(s) that is(are) currently stored by the host 14 is(are) different from a previous stored value, i.e. a change of the value of the configuration parameter(s) has occurred with respect to a previous successful access to the PDS 18, so as to access the PDS 18.

To detect such a PDS access failure with possibly the configuration parameter(s), the applet requests preferably the host 14 to access from the host 14 to the PDS 18 by using a particular command that forces the host 14 to use the configuration parameter(s) that the host 14 stores.

If the SE 12 receives from the host 14 a last updated value relating to the HFN start PS that corresponds to a PDS access failure relating to a requested access, then the SE 12 may have found out a presence of a corrupted configuration parameter(s), i.e. either an absence of any stored configuration parameter(s) or an erroneous configuration parameter(s).

On the contrary, if the SE 12 detects that the host 14 has succeeded in establishing an access to the PDS 18, then the applet may further allow carrying out a detection of a failure of the access (i.e. the activated PDP context (and/or the activated PDN connection)) to the PDS 18.

The PDS access failure may be a closure or a drop.

In case of a PDS access failure, the SE 12 may have found out a presence of a corrupted configuration parameter(s), i.e. an absence of any stored configuration parameter(s) or an erroneous configuration parameter(s).

Once the configuration parameter(s) is(are) detected as being non-right further to a PDS access failure, the SE 12 is preferably able to let the host 14 recover the right configuration parameter(s) relating to the concerned host 14 and that allow(s) accessing, through the mobile network(s) 16, the PDS 18.

The reason for the PDS access failure may be a drop due to a mobile network 16 issue, a host 14 issue, a PDS 18 issue, a change of the PDS 18 configuration parameter(s), like e.g. an APN, and/or a change of the network 16 access conditions, like e.g. a bad quality of (received) signal or a change of RAT, such as a 3G to 4G type technology.

The SE 12 is incorporated within (or coupled to) the host 14, as a SE host device.

Alternately, the host 14 comprises the chip 12 that is removable from the host 14.

The host I/O interfaces include one or several I/O interfaces for exchanging data with the SE 12.

The host I/O interface with the SE 12 may be an International Organization for Standardization (or ISO) 7816 interface, as a contact interface, when the SE 12 is inserted, in a removable manner, within the host 14.

Alternately, instead of a contact interface, the host I/O interface with the SE 12 is connected to or includes a contact-less interface. The host 14 is connected to or includes means for communicating data while using preferably a Short Range (or SR) RF link. The SR RF link may be related to any technology that allows the host 14 to exchange data, through a so-termed contact-less link with the SE 12. The SR RF may be fixed at 13.56 MHz and related to a Near Field Communication (or NFC) type technology, or ISO 14443, as a contact-less technology.

The host 14 includes data processing means, such as a (micro)processor(s) (and/or a (micro)controller(s)), data storing means (not represented), as a phone memory, and one or several I/O interfaces that are linked all together through a control and data bus (not represented).

The phone 14 plays, in a preferential manner, a role of a modulator-demodulator (or modem), so as to exchange data in a wireless manner over the network 16 with the PDS 18.

The host memory may comprise one or several memories including one or several volatile memories and one or several non-volatile memories.

The host memory, be it either volatile or non volatile, stores, at least in a temporary manner, data relating to a configuration parameter(s) that allow(s) configuring an access, through a connected mobile network(s) 16, to the PDS 18.

The host memory stores e.g. an International Mobile Equipment Identity (or NEI) and/or an email address, as an identifier(s) relating to the host 14.

The host memory stores an OS and one or several applications.

Optionally, the host 14 includes a display screen 142 and a keyboard 144, as a Man Machine Interface (or MMI).

The host 14 carries out the following operations:

a modulation of an analogical carrier signal to encode digital information to be transmitted, over an antenna 146, to one (or several) mobile network(s) 16; and a demodulation of a received analogical carrier signal to decode the encoded digital information that is received, over the antenna 146, from one (or several) network(s) 16.

The antenna 146 allows communicating data, Over-The-Air (or OTA), through an LR RF link 15, with the mobile network 16.

The mobile network 16 is a visited network.

The mobile network 16 is related to a home or foreign country with respect to the subscriber.

The mobile network 16 includes a base station 162 (or the like) that is used for communicating with an LR RF enabled device(s), like e.g. the host 14. The base station 162 covers at least in part a geographical area in which the host 14 is located.

The mobile network 16 includes a Gateway (or GW) 164.

The mobile network 16 may be a Gateway GPRS Support Node (or GGSN) in a second Generation (or 2G) and a third Generation (or 3G) type network, a Mobility Management Entity (or MME) in a fourth Generation (or 4G) type network or any other network entity connected to the PDS 18.

The mobile network 16 has its own APN, as a name of a gateway to the PDS 18, that is specific to only the mobile network 16.

The GW 164 is connected, indirectly through internal network links 163, to the base station 162.

The GW 164 is connected, through a wire link(s) 17, to the PDS 18.

The base station 162 is also connected, through several network links, to a (remote) server (not represented).

The server is hosted by a computer with data processing means and data storing means.

The server allows getting a right configuration parameter(s), like e.g. an APN, for configuring an access (from the host 14) to the PDS 18.

The server accesses a database stored in a memory (not represented) that is present within or connected to the server.

The database includes a correspondence table that includes, for at least one identifier, like e.g. an IMEI, of an SE host device, an associated configuration parameter(s), like e.g. an APN, to be used by the concerned SE host device, in order to access the PDS 18.

The associated configuration parameter(s) may depend on at least the host 14.

If the right configuration parameter to be injected into the SE host device is related to the mobile network 16 and if the TE 10 is not under a radio-coverage of the mobile network that is associated with the (current) configuration parameter, then the TE 10, once (re-)configured with the right configuration parameter, gets access, through the corresponding gateway relating to the mobile network 16, to the PDS 18.

The server is able to restore a corresponding right configuration parameter(s) to be stored within an SE host device, like e.g. the host 14, and to launch preferably a PDS access request once the right configuration parameter(s) is(are) stored at the host 14.

The server is thus able to provide a requesting device, like e.g. the SE 12, that identifies at least its host by using an identifier(s), like e.g. an IMEI, a Mobile Station International Subscriber Directory Number (or MSISDN) and/or other input(s), so as to get a corresponding predetermined configuration parameter(s), as a corresponding output(s).

Figure 2:
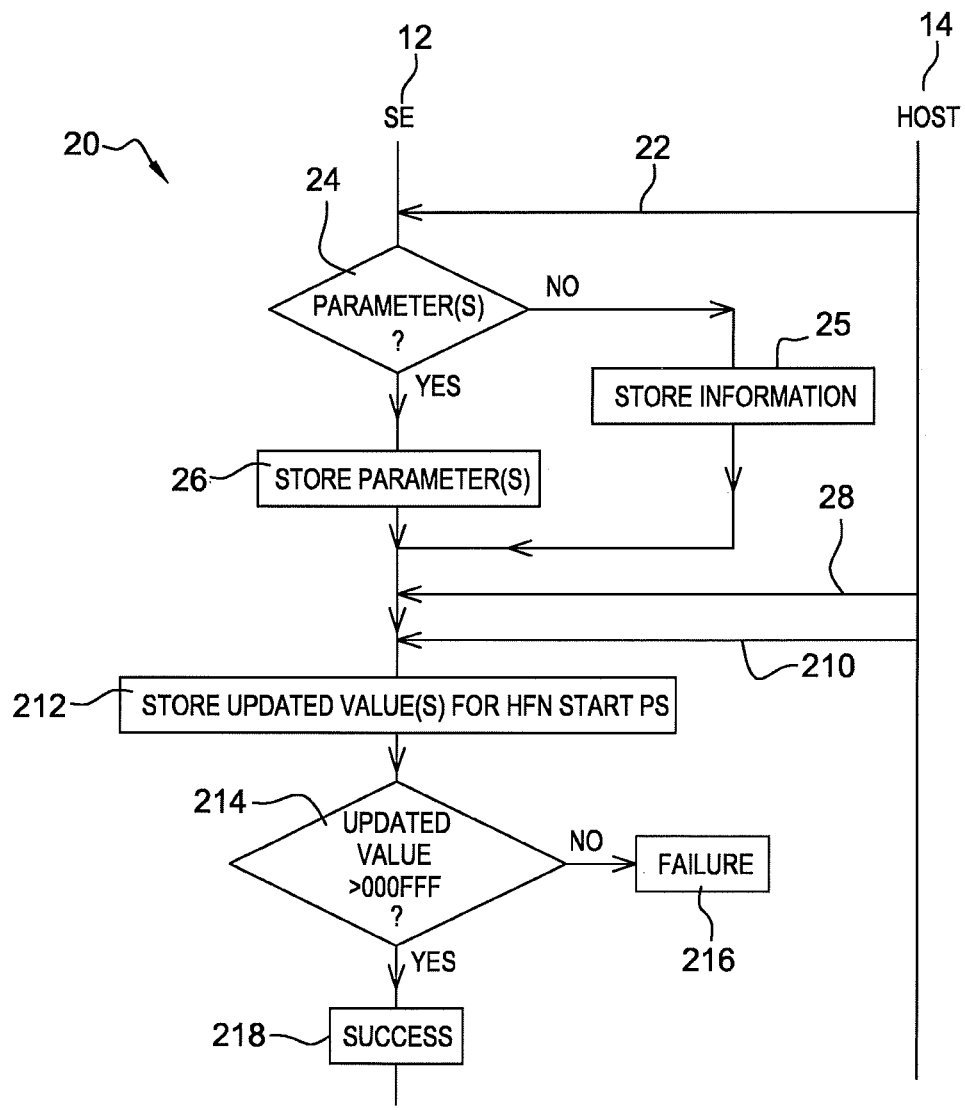
FIG. 2 illustrates an example of a flow of messages exchanged between notably the phone and the chip of FIG. 1, so that the chip detects that the 3G PDP context has or has not been failed, and, if not, further detects that the activated 3G type PDP context may have been closed or dropped depending on one (or several) predetermined condition(s).

FIG. 2 depicts an exemplary embodiment of a message flow 20 that involves the SE 12 and the host 14, so that the SE 12 is able to detect a success or a failure in a 3G PDP context, and in case of a failure, possibly a closure or a drop in the 3G PDP context.

Firstly, the SE 12 sends to the host 14 a message (not represented) including an initialisation value relating to the HFN start PS, as data relating to the HFN start PS.

In another scenario, instead of a PDP context, the SE 12 detects a success or a failure in an EPS PDN connection by using, instead of a CC PDP context activation type event, a CC EPS PDN connection activation type event while the other messages of the message flow 20 remain the same by referring to the EPS PDN connection instead of the PDP context.

For instance, the host 14 user browses on the host browser and requests thus an access to the PDS 18.

The host 14 initiates a PDS connection procedure, so as to establish a PDP context with the mobile network 16.

The SE 12 receives from the host 14 a CC PDP context activation type event 22.

Optionally, the CC PDP context activation type event 22 includes (or is accompanied with) an APN1, as a value of one configuration parameter for configuring an access to the PDS 18.

The SE 12 applet determines 24 whether the CC PDP context activation type event 22 does or does not include (or is or is not accompanied with) a configuration parameter(s).

If the CC PDP context activation type event 22 does not include (or is not accompanied with) any configuration parameter, then the SE 12 applet does not store any configuration parameter(s) or stores temporary data, like e.g. as "length" 0, as information relating to an absence of configuration parameter, and goes to the next step 28.

Otherwise, i.e. if the CC PDP context activation type event 22 includes (or is accompanied with) e.g. the APN1, as one configuration parameter, the SE 12 applet collects and stores 26 at least temporarily (in a RAM or the like) the (received) APN1. In the explained example, it is assumed that a PDS access attempt is successful by using the APN1, as a first value of the single configuration parameter, that the host 14 stores. The SE 12, further to a successful access to the PDS 18, also stores the APN1.

However, the invention is still applicable if there are several configuration parameters instead of a single configuration parameter.

The SE 12 may transmit to the host 14 a message (not represented), like e.g. "91XX", for informing the host 14 that the SE 12 has received the CC PDP context activation type event 22 (along with possibly a configuration parameter(s)). Once such a message is received by the host 14, the host 14 launches an attachment procedure to the mobile network 16 and, when successful, i.e. identified and preferably authenticated to the mobile network 16, the host 14 launches a PDP context activation procedure.

The SE 12 receives preferably from the host 14 a message 28 that includes e.g. LOCI or AT information, as information relating to an initial RAT.

Instead of receiving the information relating to an initial RAT after receiving the CC PDP context activation type event 22, the SE 12 receives the information relating to an initial RAT prior to receiving the CC PDP context activation type event 22.

The SE 12 receives from the host 14 one or several messages 210, like e.g. "UPDATE EF HFN START TO MAX VALUES" including or being accompanied with an updated value relating to the HFN START-PS, as a received updated value relating to the HFN START-PS.

The SE 12 stores 212 each updated value for HFN START-PS.

Then, the SE 12 compares 214 the nibbles that follow e.g. "0X0FFFFF", as the last (received) updated value relating to the HFN START-PS, to the nibbles that follow e.g. "0X000FFF", as the predetermined value relating to the HFN START-PS.

The two first nibbles "0X" mean that the following data are in an hexadecimal notation.

If the last updated value relating to the HFN START-PS is less than or equal to the predetermined value relating to the HFN START-PS, then the SE 12 detects that the PDP context has been unsuccessfully activated, i.e. a PDS access attempt failure 216.

Otherwise, i.e. if the last updated value relating to the HFN START-PS is greater than the predetermined value relating to the HFN START-PS, the SE 12 detects that the PDP context has been successfully activated, i.e. a PDS access attempt success 218. After a successful activation of the PDP context, the PDS connection procedure (not represented) is continued or another PDS connection procedure (not represented) is launched, so as to keep the activated PDP context or establish another PDP context with the mobile network 16 respectively.

Thus, the afore mentioned message flow is played once again with another value of a single configuration parameter.

The SE 12 receives from the host 14 another CC PDP context activation type event (not represented).

Optionally, the CC PDP context activation type event includes (or is accompanied with) an APN2, as a value of one single configuration parameter for configuring an access to the PDS 18.

The SE 12 applet determines (not represented) whether the CC PDP context activation type event does or does not include (or is or is not accompanied with) a configuration parameter(s).

If the CC PDP context activation type event does not include (or is not accompanied with) any configuration parameter, then the SE 12 applet does not store any configuration parameter(s) or stores temporary data, like e.g. as "length" 0, as information relating to an absence of configuration parameter, and goes to the next step.

Otherwise, i.e. if the CC PDP context activation type event includes (or is accompanied with) e.g. the APN2, as a value of one single configuration parameter, the SE 12 applet collects and stores (not represented) at least temporarily (in a RAM or the like) the APN2.

It is assumed that the (received) APN2 (different from the APN1) relating to the mobile network 16 constitutes a non-right (single) configuration parameter to be used to access, over the mobile network 16, the PDS 18.

The SE 12 receives from the host 14 one or several messages (not represented), like e.g. "UPDATE EF HFN START TO ZERO VALUES" including or being accompanied with an updated value relating to the HFN START-PS, as a received updated value relating to the HFN START-PS.

The SE 12 stores, instead of one or several previous last updated values relating to the HFN START-PS (for the previous PDS access attempt), each updated value for HFN START-PS.

Then, the SE 12 compares the nibbles that follow e.g. "0X00001E", as the last (newly received) updated value relating to the HFN START-PS, to the nibbles that follow e.g. "0X000FFF", as the predetermined value relating to the HFN START-PS. According to another example, instead of "0X00001E", as the last (newly received) updated value relating to the HFN START-PS, it may be a value comprised between the two values that follow "0X000002" and "0X000022".

If the last updated value relating to the HFN START-PS is greater than the predetermined value relating to the HFN START-PS, then the SE 12 detects that possibly another PDP context has been successfully activated, i.e. another PDS access attempt success (not represented).

Otherwise, i.e. if the last updated value relating to the HFN START-PS is less than or equal to the predetermined value relating to the HFN START-PS, the SE 12 detects that the activated PDP context has been unsuccessfully activated, i.e. a PDS access attempt failure (not represented).

A reason of such a PDS access attempt failure may be a closure or a drop.

The drop may be assumed if a current RAT used by the host 14 to access a mobile network has been detected (not represented) by the SE 12 while not having changed, i.e. the current RAT is still 3G type technology. In such a scenario, the SE 12 has previously received from the host 14 a message (not represented) that includes e.g. LOCI, as information relating to the current RAT.

The closure may be assumed if a current RAT used by the host 14 to access a mobile network has been detected (not represented) by the SE 12 while having changed, i.e. the current RAT is e.g. a 4G type technology (and no more the 3G type technology). In such a scenario, the SE 12 receives from the host 14 a message (not represented) that includes e.g. an "Access Technology Change event" or the like, as information relating to the current RAT.

After such a PDS access attempt failure detection, a right configuration parameter(s), like e.g. an APN3, may be recovered by the host 14 e.g. at the SE 12 initiative. The host 14 stores the APN2. In such a scenario, the SE 12 (or another device, like e.g. a server) triggers a restoration (not represented) of the right APN3 into the host 14 either from a remote server or the SE 12, so as to replace the stored APN2 by the APN3 and access successfully the PDS 18 after an additional attempt to create a PDP context.

The invention solution does not need to involve a phone user, except for submitting user authentication data, when applicable.

The invention solution is therefore transparent to the user (no need of any MMI), apart from a possible user authentication operation.

The invention solution is compatible with the existing network infrastructure.

The invention solution allows detecting a success or a failure in a PDP context (or an EPS PDN connection) possibly with a failure reason(s) by using a specific EF that tracks an update of the HFN start PS value to determine a last updated HFN start PS value to be compared to a registered HFN start PS value, as a predetermined (reference) HFN start PS value.

The invention solution may allow finding a wrong or spurious configuration parameter(s), like e.g. an APN, as a non-right configuration parameter(s) resident in the host.

Then, a recovery of a right configuration parameter(s) to be injected into the host may be carried out under a chip control as soon as the configuration parameter(s) is(are) detected as being corrupted. The right configuration parameter recovery or restoration may be on-line and secure.

Thus, the host user benefits from a good user experience.

The invention claimed is:

1. A method for detecting a failure in a Packet Data Protocol or PDP context or an Evolved Packet System or EPS Packet Data Network or PDN connection, wherein a SIM type chip is incorporated within or coupled to a device, the PDP context or the EPS PDN connection allowing to have, once successfully activated, a data connectivity between the device and a Packet Data Service or PDS type network, the SIM type chip including at least one processor and at least one memory, the device including at least one processor and at least one memory, the at least one SIM type chip processor being separate from the at least one device processor, the at least one SIM type chip memory being separate from the at least one device memory, the SIM type chip memory storing an Elementary File or EF including data relating to an HyperFrame Number or HFN start Packet Switch or PS, the method comprising:
receiving, by the SIM type chip, from the device, a call control PDP context activation type event or a call control EPS PDN connection activation type event;
receiving, by the SIM type chip, from the device, at least one updated value relating to the HFN start PS;
storing, by the SIM type chip, the at least one updated value relating to the HFN start PS;
comparing by the SIM type chip the last of the at least one updated value relating to the HFN start PS to a predetermined value relating to the HFN start PS;
detecting, by the SIM type chip, if the last of the at least one updated value relating to the HFN start PS is less than or equal to the predetermined value relating to the HFN start PS, that the PDP context or the EPS PDN connection has been unsuccessfully activated.

2. The method according to claim 1, wherein the call control PDP context activation type event or the call control EPS PDN connection activation type event comprises at least one configuration parameter for configuring an access to a Packet Data Service of PDS type network and the SIM type chip stores the at least one configuration parameter for configuring an access to the PDS type network.

3. The method according to claim 2, wherein the at least one configuration parameter for configuring an access to the PDS type network includes at least one element of a group comprising:
at least one user name;
at least one password;
at least one user credentials;
at least one Access Point Name or APN;
at least one Uniform Resource Locator or URL;
at least one Internet Protocol or IP address;
at least one address type;
at least one Quality of Service or QoS.

4. The method according to claim 1, wherein, prior to receiving, from the device, the at least one updated value relating to the HFN start PS, the SIM type chip detects whether an initial radio access technology used by the device to access a mobile network is or is not a 3G type technology.

5. The method according to claim 4, wherein, if the SIM type chip detects that the initial radio access technology used by the device to access the mobile network is the 3G type technology, the SIM type chip further detects whether the device does or does not access the mobile network by still using or not the 3G type technology.

6. The method according to claim 1, wherein the EF includes an EF start-HFN, the EF start-HFN being compliant with the ETSI TS 131.102 v12.5.0.

7. The method according to claim 1, wherein, after a successful activation of the PDP context or the EPS PDN connection, the SIM type chip receives from the device at least one updated value relating to the HFN start PS, the SIM type chip stores, instead of at least one previous updated value relating to the HFN start PS, the at least one updated value relating to the HFN start PS, the SIM type chip compares the last of the at least one updated value relating to the HFN start PS to the predetermined value relating to the HFN start PS, if the last of the at least one updated value relating to the HFN start PS is less than or equal to the predetermined value relating to the HFN start PS, then the SIM type chip detects that the activated PDP context or EPS PDN connection has failed.

8. A SIM type chip for detecting a failure in a Packet Data Protocol or PDP context or an Evolved Packet System or EPS Packet Data Network or PDN connection, the SIM type chip including at least one processor and at least one memory, wherein, the SIM type chip is configured to be incorporated within or coupled to a device, the PDP context or the EPS PDN connection allowing to have, once successfully activated, a data connectivity between the device and a Packet Data Service or PDS type network, the device including at least one processor and at least one memory, the at least one SIM type chip processor being separate from the at least one device processor, the at least one SIM type chip memory being separate from the at least one device memory, the SIM type chip's memory storing an Elementary File or EF including data relating to an HyperFrame Number or HFN start Packet Switch or PS, and wherein the SIM type chip's processor is configured to:

receive, from the device, a call control PDP context activation type event or a call control EPS PDN connection activation type event;

receive, from the device, at least one updated value relating to the HFN start PS;

store the at least one updated value relating to the HFN start PS;

compare the last of the at least one updated value relating to the HFN start PS to a predetermined value relating to the HFN start PS; and detect, if the last of the at least one updated value relating to the HFN start PS is less than or equal to the predetermined value relating to the HFN start PS, that the PDP context or the EPS PDN connection has been unsuccessfully activated.

9. A system for detecting a failure in a Packet Data Protocol or PDP context or an Evolved Packet System or EPS Packet Data Network or PDN connection, wherein the system comprises at least one device and a SIM type chip, the SIM type chip being incorporated within or coupled to the device, the SIM type chip including at least one processor and at least one memory, the PDP context or the EPS PDN connection allowing to have, once successfully activated, a data connectivity between the device and a Packet Data Service or PDS type network, the device including at least one processor and at least one memory, the at least one SIM type chip processor being separate from the at least one device processor, the at least one SIM type chip memory being separate from the at least one device memory, the SIM type chip the chip's memory storing an Elementary File or EF including data relating to an HFN start PS, and wherein the SIM type chip is configured to:

receive, from the device, a call control PDP context activation type event or a call control EPS PDN connection activation type event;

receive, from the device, at least one updated value relating to the HFN start PS;

store the at least one updated value relating to the HFN start PS;

compare the last of the at least one updated value relating to the HFN start PS to a predetermined value relating to the HFN start PS; and detect, if the last of the at least one updated value relating to the HFN start PS is less than or equal to the predetermined value relating to the HFN start PS, that the PDP context or the EPS PDN connection has been unsuccessfully activated.

* * * * *